United States Patent [19]

Bolie

[11] Patent Number: 4,731,572
[45] Date of Patent: Mar. 15, 1988

[54] PRECISION ELECTRONIC SPEED CONTROLLER FOR AN ALTERNATING-CURRENT

[75] Inventor: Victor W. Bolie, Albuquerque, N. Mex.

[73] Assignee: The United States of America as represented by the Department of Energy, Washington, D.C.

[21] Appl. No.: 450,841

[22] Filed: Dec. 17, 1982

[51] Int. Cl.$^4$ .............................................. H02P 1/46
[52] U.S. Cl. .................................. 318/721; 318/314; 318/807
[58] Field of Search ........................ 318/721, 722–724, 318/714, 702, 713, 715, 313, 314, 798–802, 806, 807, 809, 811

[56] References Cited

U.S. PATENT DOCUMENTS

| | | | |
|---|---|---|---|
| 3,873,900 | 3/1975 | Sommer | 318/314 |
| 3,919,634 | 11/1975 | Appel | 318/314 X |
| 3,946,293 | 3/1976 | Feld | 318/799 |
| 4,160,939 | 7/1979 | Damouth | 318/723 |
| 4,223,261 | 9/1980 | White | 318/722 X |
| 4,310,787 | 1/1982 | Seeger | 318/721 X |
| 4,312,031 | 1/1982 | Kudor | 318/811 X |

OTHER PUBLICATIONS

Wallace, G. R. and Sims, "A Phase Locked Neutron Chopper Rotor Drive System", U.K. Atomic Energy Authority, Harwell, Paper No. AERE-R 9411, Sep. 1980.
"Harwell M. K., VIII Rotor Drive System for Neutron Time-of-Flight Experiments", U.K. Atomic Energy Authority, Harwell, Mar. 1980.
Bolie, V. et al., "A Phased Chopper at WNR", Los Alamos Unclassifed Report No. LA-UR-82-2480.

Primary Examiner—William M. Shoop, Jr.
Assistant Examiner—Patrick C. Keane
Attorney, Agent, or Firm—William A. Eklund; Paul D. Gaetjens; Judson R. Hightower

[57] ABSTRACT

A high precision controller for an alternating-current multi-phase electrical motor that is subject to a large inertial load. The controller was developed for and is particularly suitable for controlling, in a neutron chopper system, a heavy spinning rotor that must be rotated in phase-locked synchronism with a reference pulse train that is representative of an ac power supply signal having a meandering line frequency. The controller includes a shaft revolution sensor which provides a feedback pulse train representative of the actual speed of the motor. An internal digital timing signal generator provides a reference signal which is compared with the feedback signal in a computing unit to provide a motor control signal. In the preferred embodiment, the motor control signal is a weighted linear sum of a speed error voltage, a phase error voltage, and a drift error voltage, each of which is computed anew with each revolution of the motor shaft. The stator windings of the motor are driven by two amplifiers which are provided with input signals having the proper quadrature relationship by an exciter unit consisting of a voltage controlled oscillator, a binary counter, a pair of readonly memories, and a pair of digital-to-analog converters.

4 Claims, 13 Drawing Figures

CHOPPER CONTROL SYSTEM (18)

MOTOR CONTROL UNIT (40)

PHASE UPDATE CIRCUIT (60a)

LATCHING GATE (86)

SPEED UPDATE CIRCUIT (60b)

PULSE TRAIN GENERATOR CIRCUIT (145)

LATCHING GATE (138-144)

TRANSFER FUNCTION OF SPEED UPDATE CIRCUIT (60b)

PULSE DELAY UNIT (130)

Fig. 11 DRIFT UPDATE CIRCUIT (60c)

BYTE STATUS SENSOR (184)

UP-DOWN CONTROLLER (186)

ial load.
PRECISION ELECTRONIC SPEED CONTROLLER FOR AN ALTERNATING-CURRENT

BACKGROUND OF THE INVENTION

The invention disclosed herein is generally related to motor controllers, and more particularly to controllers for multi-phase, alternating-current electrical motors. This invention is the result of a contract with the U.S. Department of Energy (Contract No. W-7405-ENG-36).

The invention described and claimed below was developed to meet a need for a controller for a motor used to drive a neutron chopper at the Los Alamos Meson Physics Facility, located at the Los Alamos National Laboratory in Los Alamos, New Mexico. The Facility is centered around an 800 Mev linear proton accelerator that is powered by a heavy-duty commercial ac power system. The accelerator is keyed to fire in synchronism with the successive peaks and valleys of the 60 Hz ac power signal so as to produce a pulsed beam of protons at a nominal frequency of 120 Hz. The protons strike a suitable spallation target to produce 120-Hz bursts of neutrons in synchronism with the proton beam. Each burst of neutrons has a duration of less than 0.002 second and consists of neutrons having a range of energies. The neutrons are confined to a beam by suitable solid-angle stops and are selected according to their energy by means of a neutron chopper. The chopper consists of a heavy, slotted metal cylinder which is suspended in the neutron beam and which is spun in phase-locked synchronism with the 120-Hz accelerator pulses. Only those neutrons having a selected narrow range of energies pass through the chopper; all others are intercepted. The particular problem to which this invention is directed arises from the fact that the frequency of the ac power supply varies slightly from its nominal value of 60 Hz, which is in fact only a day-long average frequency. Short-term deviations in frequency are approximately Gaussian in distribution, with approximately 0.015 Hz rms value, and are of exponentially diminishing spectral density with approximately 0.035 Hz FWHM (full width at half-maximum) spread. Rotational energy, in properly controlled amounts, must therefore be continually transferred into and out of the neutron chopper in order to keep its angle of rotation in phase alignment with the zero-crossings of the ac power signal. Conventional methods of shaft-drive control are inadequate for this purpose because of the large moment of inertia of the rotor (200–800 kg cm$^2$) and the small tolerance (less than ±1 degree) of the tracking error. For example, conventional synchronos motors are inadequate because they have poor stability and respond slowly under heavy inertial loads. Standard servomotors are inadequate because their rate generators are too insensitive to detect small speed changes. In this regard, a particular problem is that speed feedback from the chopper is needed for stability, but the speed changes required are very small. Electronically, an ordinary square-wave phase detector cannot be used because of the unacceptable time lag in its smoothing filter. The conventional variable-frequency thyristor power unit used with three-phase motors has a waveform which is too coarse for fine-resolution control of speed and phase.

SUMMARY OF THE INVENTION

Accordingly, it is an object and purpose of the present invention to provide a controller for accurately and precisely controlling the speed of a multi-phase, alternating-current electrical motor that is subject to a substantial inertial load.

It is also an object to provide such a controller which is also capable of controlling the phase of the motor with respect to an alternating-current power supply signal or other signal having a meandering line frequency.

It is another object of the present invention to provide a controller for maintaining the speed and phase of an ac motor with respect to a signal pulse train of meandering repetition rate, while also correcting for drift of the motor.

It is yet another object to provide a controller that attains the foregoing objects and which also provides in digital form a drift-cancelling phase error integrator and an associated overflow-avoidance monitor.

To achieve the foregoing and other objects, and in accordance with the purposes of the present invention as embodied and broadly described herein, the present invention provides a controller for controlling, with a high degree of precision, the speed of a multi-phase, alternating-current motor that is subject to a substantial inertial load and which is to be rotated at a substantially constant speed that corresponds with the long-term average repetition rate of a reference pulse train that may be representative of an ac power supply signal subject to a meandering line frequency.

The controller comprises a shaft revolution sensor that is operable to provide a feedback pulse train signal which has a frequency that is representative of the actual rotational speed of the motor. The controller further comprises a speed error signal generator for generating a speed error signal which is representative of the difference between the speed of the motor and a predetermined desired speed that is based on the time-averaged frequency of the reference pulse train. The speed error signal generator includes a digital clock that is operable to produce a timing signal pulse train having a predetermined, substantially constant frequency. The frequency of the digital clock is substantially higher than the frequency of the feedback pulse train signal from the shaft revolution sensor. The speed error signal generator further includes a digital counter which operates to count pulses of the timing signal pulse train during intervals between receipt of successive pulses of the feedback pulse train signal. After each counting interval the count value of the counter is converted to the speed error signal.

The controller further includes means for applying the speed error signal to vary simultaneously the frequencies of a set of variable frequency power amplifiers which are connected to drive the respective stator windings of the motor. In this manner, the outputs of the respective power amplifiers at all times bear the correct phase relationship with respect to one another, although their common instantaneous frequency may be varied even within a single period depending on the magnitude of the speed error signal. This obtains optimum control over the speed of the motor under conditions of high inertial load.

The controller further includes phase error signal generator means for generating a phase error signal, and drift error signal generator means for generating a drift error signal. The phase error signal is representative of the phase difference between the reference pulse train and the feedback pulse train signal. The drift error signal is representative of the time integral of the phase error signal. The speed, phase and drift error signals are combined to provide a single motor control signal which is applied in the manner described above to control the speed, as well as the phase, of the motor.

In accordance with yet another aspect of the invention, the speed error signal generator consists essentially of a counter which has a limited count capacity. During the course of a single counting interval, that is, between receipt of successive pulses of the feedback pulse train signal, the counter overflows many times. The frequency of the digital clock and the capacity of the counter are selected such that, in the event the motor is turning at its desired predetermined speed, the counter overflows a relatively large number of times and then attains a count value equal to one half of its maximum count value at the time the counter is stopped at the end of a counting interval. The count value is converted to the speed error signal at the end of each counting interval, such that the magnitude of the speed error signal is linear with respect to the value of the count. Further, the magnitude of the speed error signal is fixed at a predetermined maximum or minimum value corresponding to the upper and lower limits of the count value, in the event the counter either overflows or underflows in its last counting cycle. In this manner, a high-gain, linear speed error signal is obtained over a very narrow range of deviations in speed about the optimum value. For motor speed deviations outside this narrow range, constant speed error signals are generated. This results in a very high gain response to very small speed errors, thus permitting more precise control over the speed of the motor than has heretofore been obtainable with previously known motor controllers.

These and other aspects of the present invention will become apparent to one of ordinary skill upon consideration of the following detailed description of the preferred embodiment of the invention, when taken with the accompanying drawings.

BRIEF DESCRIPTION OF THE DRAWINGS

The accompanying drawings, which are incorporated in and form a part of the specification, illustrate the preferred embodiment of the present invention and, together with the description, serve to explain the principles of the invention. In the drawings.

DETAILED DESCRIPTION OF THE INVENTION

Figure 1:
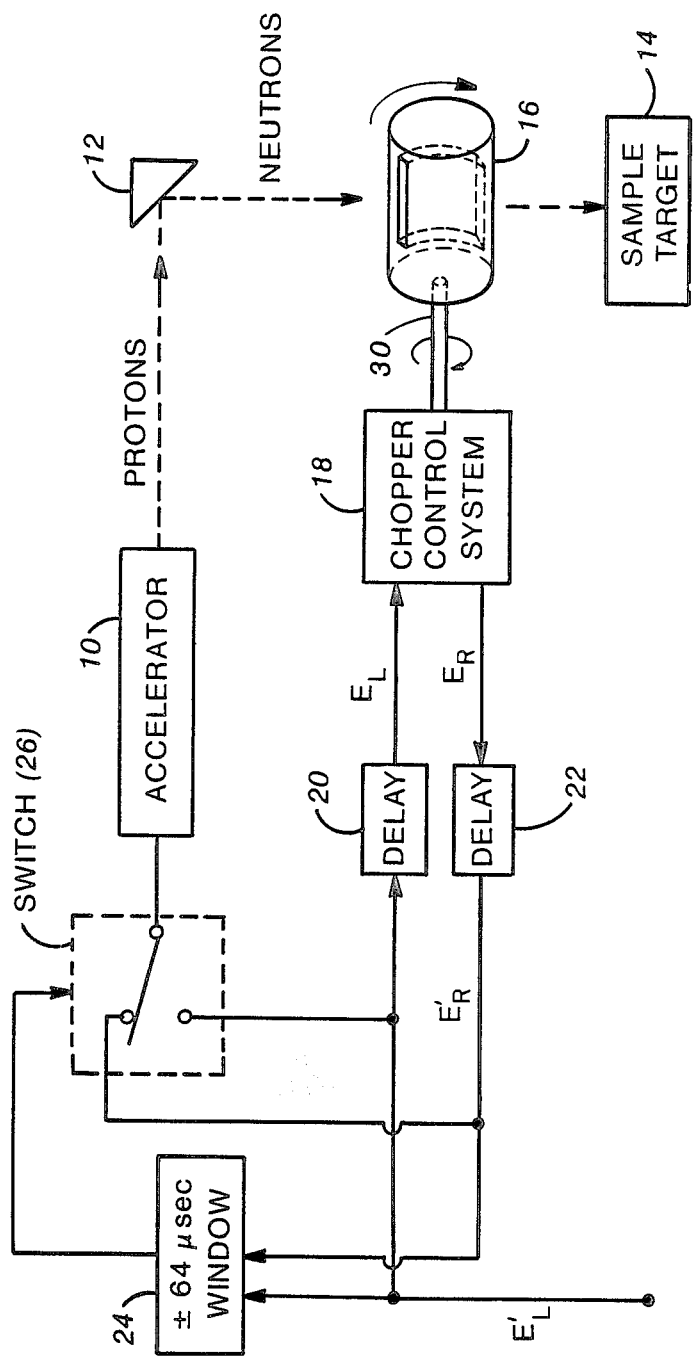
FIG. 1 is a schematic diagram illustrating the application of the motor controller of the present invention to control a neutron chopper that is associated with a large-scale atomic particle accelerator.

FIG. 1 illustrates the utilization of the present invention in the Meson Physics Facility of the Los Alamos National Laboratory at Los Alamos, New Mexico. The heart of the Meson Physics Facility is a one-half mile long linear atomic particle accelerator 10 which fires a pulsed beam of protons at a spallation target 12. The proton impact generates bursts of neutrons, which are collimated in a beam and directed at a sample target 14 for various experimental purposes. The neutrons are selected according to their energy by means of a cylindrical, slotted chopper rotor 16 which is driven by a motor that forms part of a chopper control system 18, described further below with reference to FIG. 2. The chopper control system 18 drives the chopper rotor 16 such that it is at all times in proper synchronization with the pulsed neutron beam. The chopper control system 18 receives as input a delayed power line signal $E_L$, produced by a delay unit 20, and produces a rotor synchronization feedback signal $E_R$, which is transmitted to and delayed by a second delay unit 22.

The accelerator 10 is powered by a heavy-duty commercial power line signal $E_L'$ having a nominal frequency of 60 Hz. In order to obtain the maximum beam energy, the accelerator is arranged to fire in approximate synchronism with the successive peaks and valleys of the 60-Hz waveform of the power line signal $E_L'$. The proton and neutron beams are thus pulsed at a nominal frequency of 120 Hz, with the duration of each burst of protons and neutrons being less than 0.002 seconds.

The chopper rotor 16 operates to filter out all neutrons having kinetic energies lying outside a narrow desired range. In order to effectively block the undesired neutrons, the rotor 16 must have an appreciable mass. The actual rotor consists of a heavy nickel cylinder having a series of narrow, curved slots passing through it diametrically. The rotor has an angular moment of inertia of between 200 and 800 kg cm$^2$ and must be driven with a tracking error of less than 1 degree.

The nominal 60 Hz frequency of the power line signal $E_L'$ is only a day-long average value. The true frequency actually varies slightly. Short-term variations in the frequency are approximately Gaussian in form, with a root-mean-square value of approximately 0.015 Hz and an exponentially diminishing spectral density with approximately 0.035 Hz FWHM spread. Therefore, the chopper rotor must be continually accelerated and decelerated in a carefully controlled manner in order to keep its angle of rotation in phase alignment with the zero crossings of the power line signal. Because of the large mass and moment of inertia of the rotor 16, it is impractical to control its phase to the required accuracy of ±½ microsecond alignment with the power line zero crossings. Therefore, the triggering of the accelerator is in practice allowed to vary slightly from the zero-crossing timing that would normally be used. This can be done so long as the timing of the accelerator triggering does not deviate from the zero-crossing timing by more than a small amount. In practice, therefore, the accelerator triggering is controlled either by the zero-crossings of the raw power line signal $E_L'$, or by the delayed rotor synchronization signal $E_R'$. Ordinarily, triggering is controlled by the delayed chopper synchronization signal $E_R'$, but there is a limit imposed by a window circuit 24. The window circuit 24 receives as inputs both the raw power line signal $E_L'$ and the delayed rotor synchronization signal $E_R'$. These signals are compared, and, if the delayed rotor synchronization signal $E_R'$ does not occur within 64 microseconds before or after the zero-crossing of the power line signal $E_L'$, the window circuit 24 actuates an electronic switch 26 which transfers control over triggering of the accelerator to the raw power line signal $E_L'$.

Figure 2:
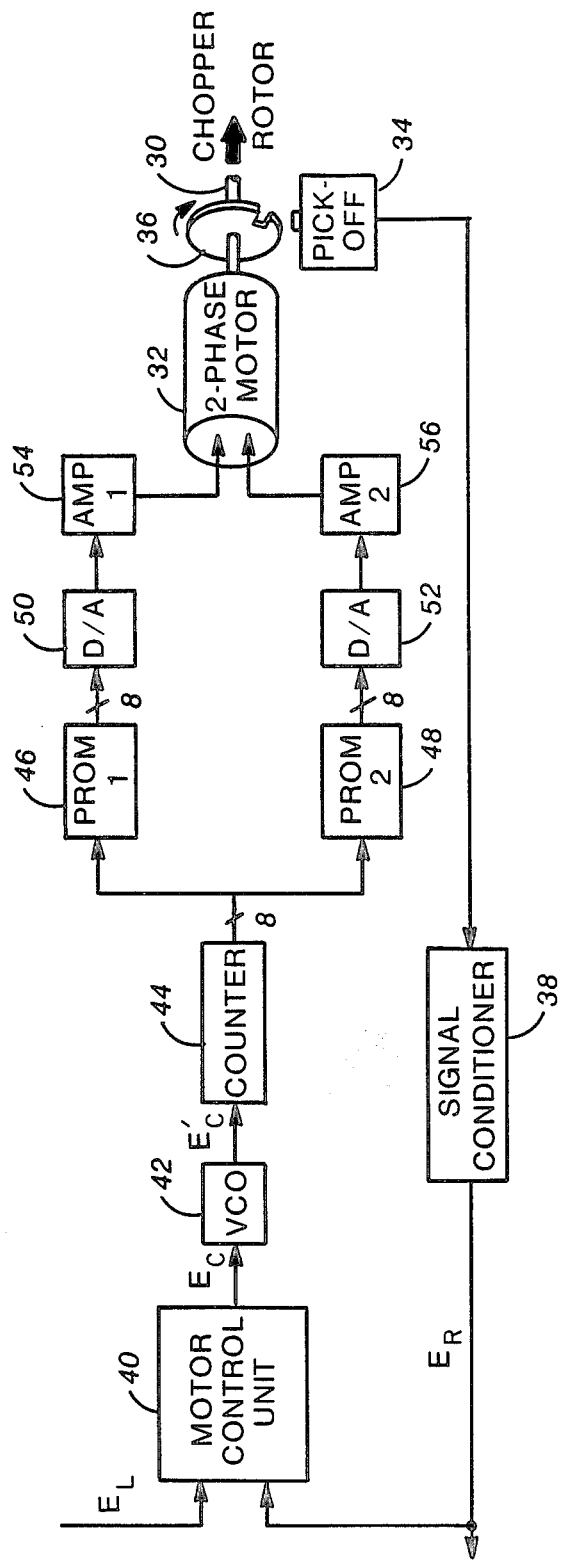
FIG. 2 is a schematic diagram illustrating the details of the chopper control system 18 of FIG. 1.
Figure 4:
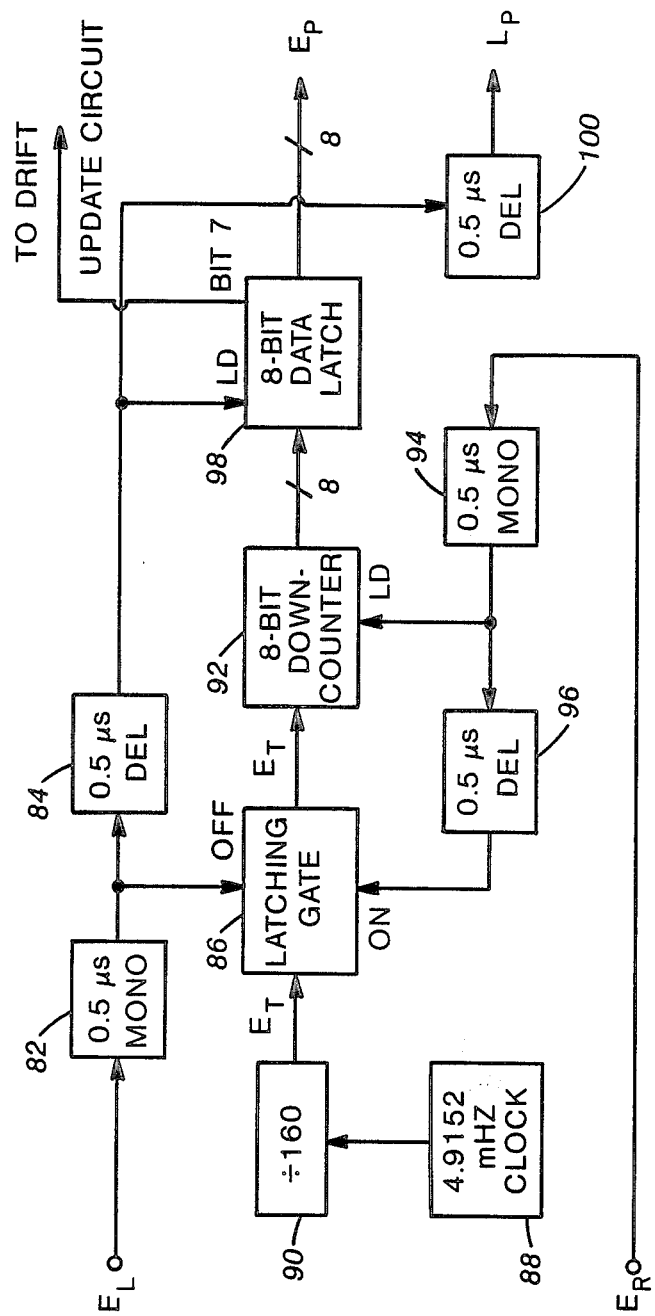
FIG. 4 a schematic diagram illustrating in further detail the phase update circuit 60a of the computing unit 60 shown FIG. 3.

FIG. 2 illustrates in greater detail the neutron chopper control system 18 of FIG. 1. The rotor 16 is connected by a driveshaft 30 to a 500-watt, two-phase, 4-pole induction motor 32 that operates at a nominal speed of 240 revolutions per second (rps). Each revolution of the driveshaft 30 is sensed by a magnetic pick-off transducer 34 which senses the passage of a slot in a ferromagnetic disk 36 attached coaxially to the shaft 30. The pick-off transducer 34 produces a raw magnetic output signal which is applied to signal conditioner 38. The signal conditioner 38 squares up the raw magnetic signal and also divides its frequency by 2 to produce the rotor synchronized feedback signal $E_R$, which has the form of a pulse train having a nominal frequency of 120 Hz and a duty cycle of approximately 2 percent. The rotor feedback signal $E_R$ is applied as one of two inputs to a motor control unit 40. The other input $E_L$ to the motor control unit 40 is a similar pulse train of approximately 2 percent duty cycle and 120-Hz nominal frequency, which is generated by the successive zero-crossings of the 60-Hz power line signal $E_L'$ and adjustably delayed by the delay unit 20 (FIG. 4). These signals $E_R$ and $E_L$ are operated on, in a manner described further below, to produce a $-10$ to $+10$ volt dc control signal $E_c$ which constitutes the output of the motor control unit 40. The slowly varying dc control signal $E_c$ is applied as the input to a voltage controlled oscillator 42, which produces a pulse train signal $E_c'$ having a variable frequency of 49.152 kHz to 73.728 kHz. This pulse train signal $E_c'$ is applied as a toggling input to an 8-bit serial counter 44. The counter 44 produces an advancing 8-bit binary address, which is transmitted via branching 8-bit data buses to each of a pair of programmable read-only memories (PROMs) 46 and 48. More specifically, each signal pulse from the voltage controlled oscillator 42 causes the counter 44 to increment its count by one, which in turn increments the address byte that is applied to the PROMs 46 and 48. Thus, the actual rate at which the address bytes are advanced is determined by the frequency of the pulse train from the oscillator 42. The reset input of the counter 44 is not utilized, so that the 8-bit counter advances to its maximum value of 255 (decimal) and then returns to zero in each counting cycle.

The PROMs 46 and 48 each have a memory capacity of 256 addressable 8-bit words, or bytes. The contents of the PROMs are 8-bit data bytes which, when taken in sequence, represent digitized sine and cosine curves, respectively. In one full counting cycle, all of the 256 memory locations of each PROM are addressed. Addressing of a given memory location results in the word stored at that location being applied to an 8-bit parallel data output bus. The data output buses from the PROMs 46 and 48 are connected to a pair of digital-to-analog (D/A) converters 50 and 52, respectively, which convert the digital sine and cosine signals to analog sine and cosine signals. The analog sine and cosine signals are applied, respectively, to a pair of 250 watt fixed-gain power amplifiers 54 and 56, which drive the respective first and second phase stator windings of the motor 32.

The PROM 46 generates a positively offset digitized sine function; that is, the sine fuction is everywhere greater than or equal to zero. Likewise, the digitized cosine function generated by the second PROM 48 is positively offset. The D/A converters, however, transform the offset sine and cosine signals to true, or non-offset, signals that range between equal positive and negative voltages.

It will be noted that the two signals applied to the power amplifiers 54 and 56, as well as the resulting power signals applied to the motor 32, are always 90 degrees out of phase with one another, in the quadrature relation of true sine and cosine functions. However, their instantaneous common frequency is variable even within a single period, or counting cycle, depending on the output of the motor control unit 40. Thus, the speed and phase of the 2-phase motor 32 is made controllable by simultaneously varying the frequency of the power applied to the two stator windings of the motor, while continuously maintaining the optimum quadrature relationship between the two stator excitations.

It is further noted that, in return for the advantages of no brushes or other sliding electrical contacts, the induction motor has some slip which causes the motor to turn at a frequency slightly less than the stator frequency. The slip frequency, i.e. the stator frequency minus the rotor frequency, will generally be positive if the bearing drag is significant, but will be negative whenever a substantial deceleration of the spinning load is required.

Figure 3:
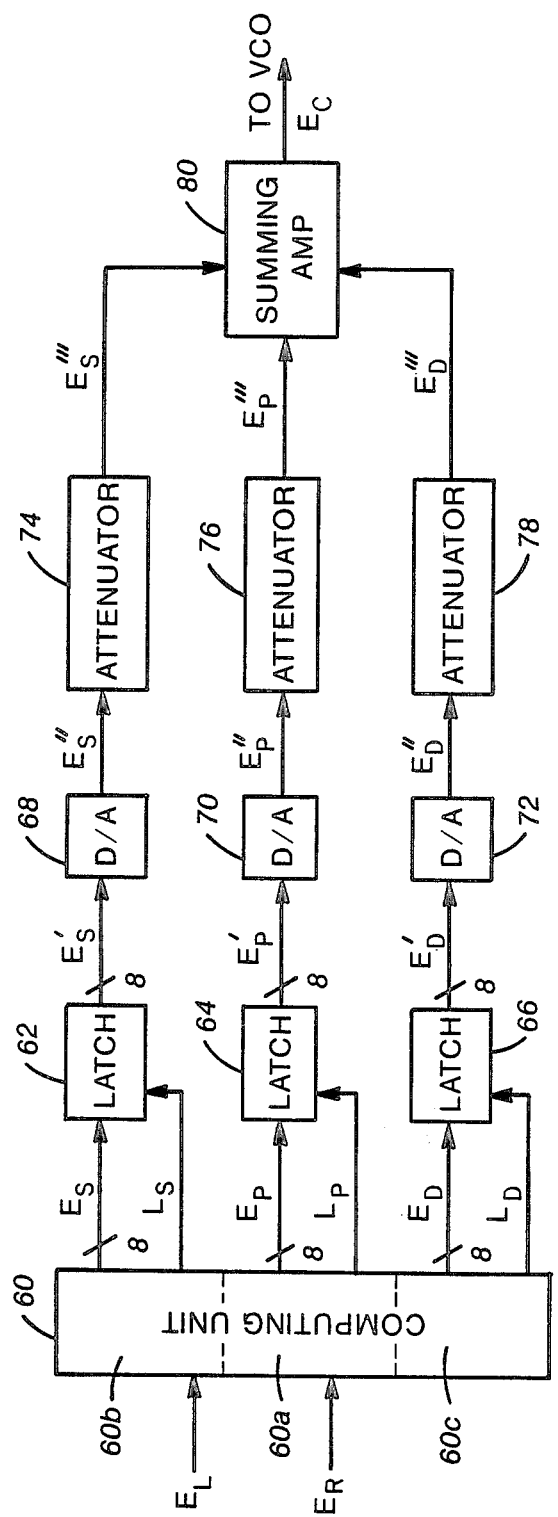
FIG. 3 a schematic diagram illustrating details of the motor control unit 40 shown in FIG. 2.

The structure and function of the motor control unit 40 are illustrated in greater detail in FIG. 3. As noted above, the inputs to the motor control unit 40 are the delayed power line signal $E_L$ and the rotor synchronized feedback signal $E_R$. The output of the motor control unit 40 is the slowly varying $-10$ to $+10$ volt dc control signal $E_c$. The input signals $E_L$ and $E_R$ are applied to a computing unit 60 which is described in further detail below and which is illustrated in detail in FIGS. 4, 6 and 11.

Briefly, the function of the computing unit 60 is to periodically generate three 8-bit update bytes $E_S$, $E_P$ and $E_D$, which relate respectively to the speed, phase and drift of the motor 32. The motor speed data byte $E_S$ is applied to a data latch 62. Likewise, the phase and drift data bytes $E_P$ and $E_D$ are applied to respective data latches 64 and 66. The data bytes $E_S$, $E_P$ and $E_D$ are loaded into their respective latches upon transmission of respective load signals $L_S$, $L_P$ and $L_D$ from the computing unit 60 to the latches. The load signals are triggered by the delayed 120 Hz line signal $E_L$, so that the contents of the three latches are updated at a rate of approximately 120 Hz. The contents of the three latches are transmitted continuously as 8-bit parallel-binary data bytes $E_S'$, $E_P'$ and $E_D'$ to a set of three digital-to-analog converters 68, 70 and 72, respectively. These three D/A converters produce analog dc signals $E_S''$, $E_P''$ and $E_D''$, which are applied to a set of three variable potentiometer attenuators 74, 76 and 78, respectively. The outputs of the three attenuators consist of dc signals $E_S'''$, $E_P'''$ and $E_D'''$, which are applied to and combined in a summing amplifier 80. The output of the summing amplifier 80 is the slowly varying dc control signal $E_c$ which is applied to the voltage controlled oscillator 42 of FIG. 2.

The signal $E_S'''$ is a speed error signal, the signal $E_P'''$ is a phase error signal, and the signal $E_D'''$ is a drift error signal. The speed error signal $E_S'''$ is proportional to the quantity $u = -W_o + dP/dt$, where $W_o = 480\pi$ radians,/-sec exactly, and where p represents the phase lead of chopper rotor with respect to arriving neutron beam pulses. The signal $E_S'''$ is polarized to decrease the value of the dc control signal $E_c$ as the speed error u increases. The signal $E_P'''$ is proportional to the phase lag of the signal $E_R$ behind $E_L$, and is polarized to increase the control signal voltage $E_c$ as the phase lag increases. Finally, the drift error signal $E_D'''$ is proportional to the integral of the phase error signal $E_P'''$ over time (the cumulative phase drift), and is polarized to increase the value of the control signal $E_c$ as the time integral increases. It is further noted here that the drift error signal $E_D'''$ functions to compensate for any gradual increase in the slip in the motor, which may result for example from wear in the bearings of the motor. The drift error signal $E_D'''$ compensates for such slow, day-to-day increases in the drag on the motor by slightly increasing the stator frequency of the motor.

Figure 6:
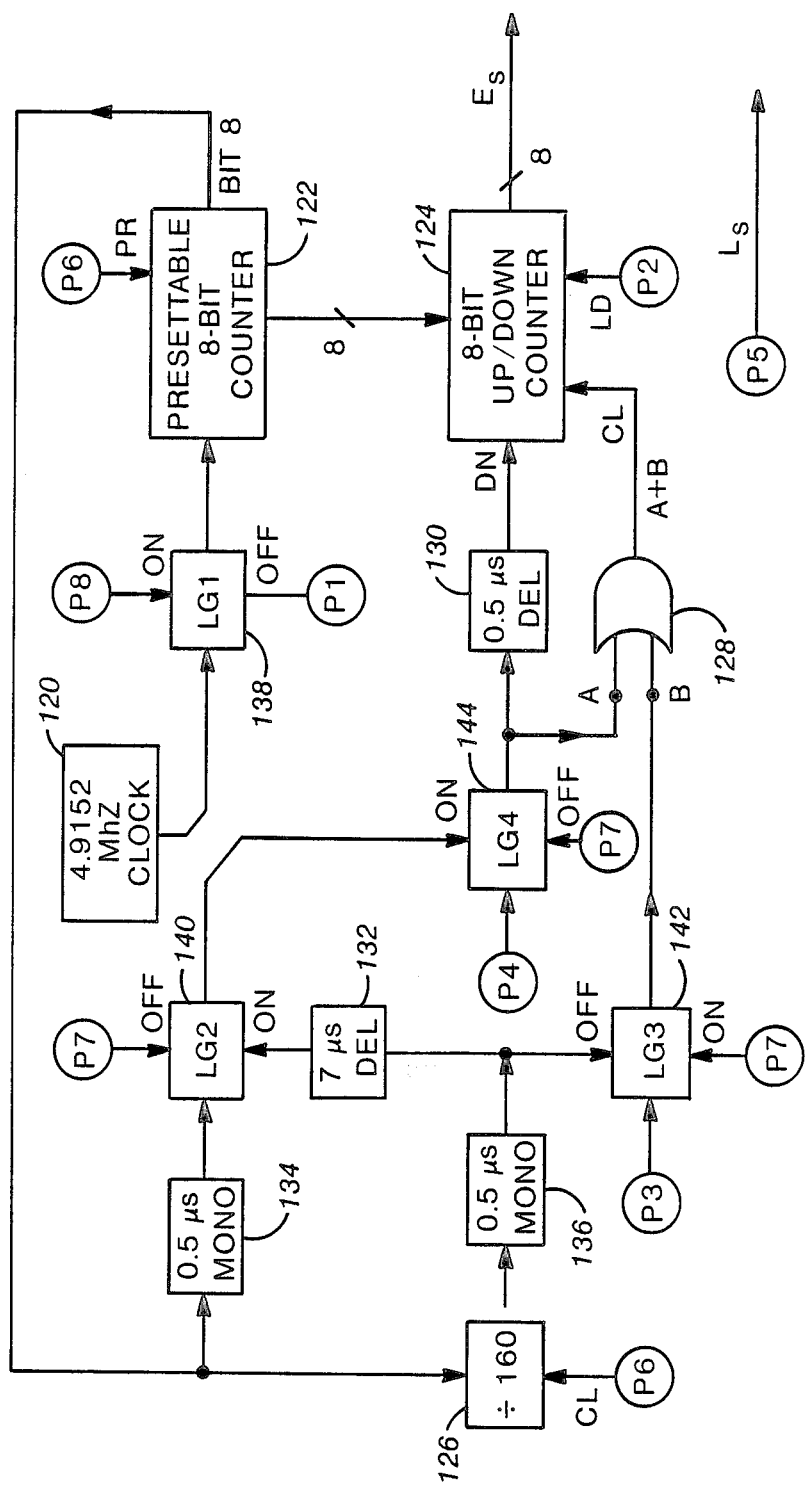
FIG. 6 is a schematic circuit diagram of the speed update circuit 60b of the computing unit 60 of FIG. 3.
Figure 11:
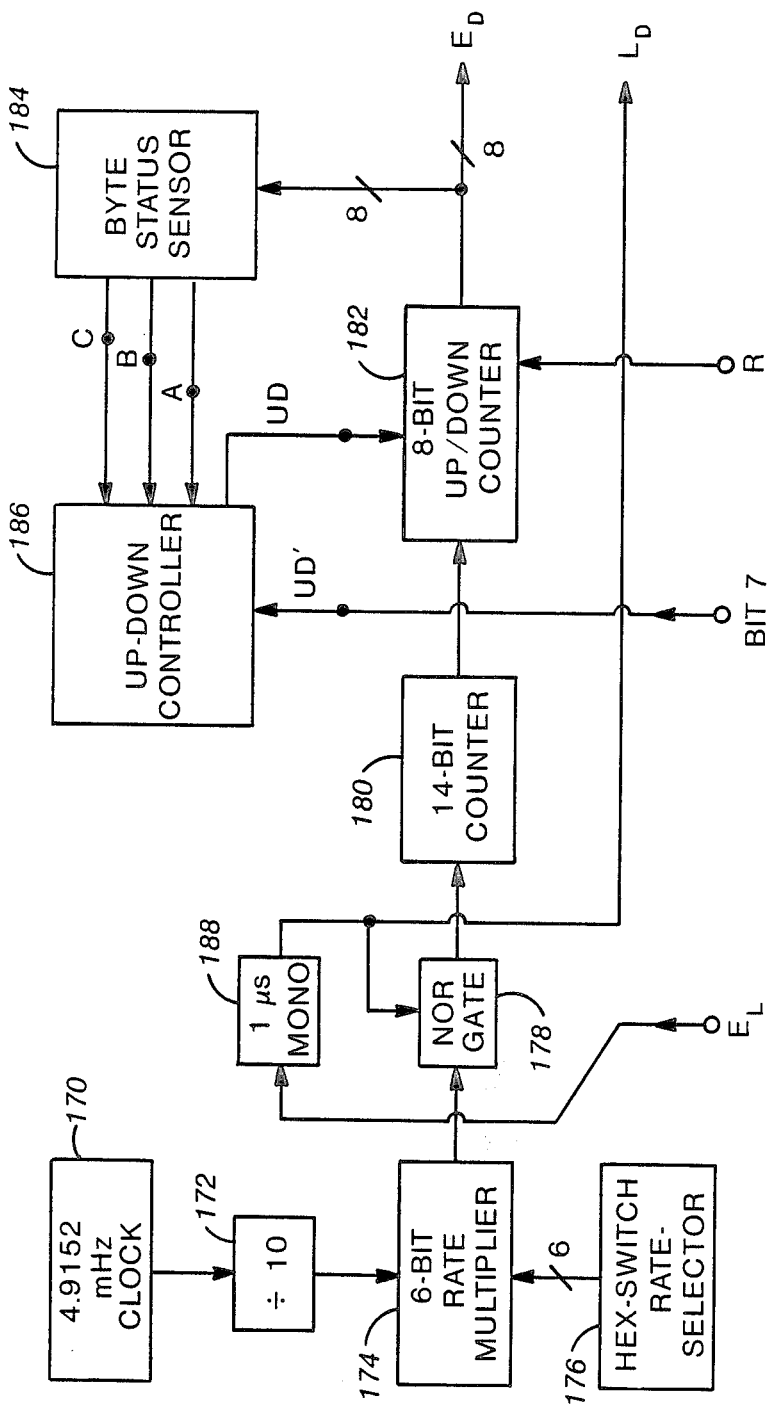
FIG. 11 is a schematic diagram of the drift update circuit 60c of the computing unit 60 of FIG. 3.

For the purpose of explanation, the computing unit 60 may be described as consisting of three circuits; a phase update circuit 60a, a speed update circuit 60b and a drift update circuit 60c, which are illustrated respectively in FIGS. 4, 6 and 11.

Figure 5:
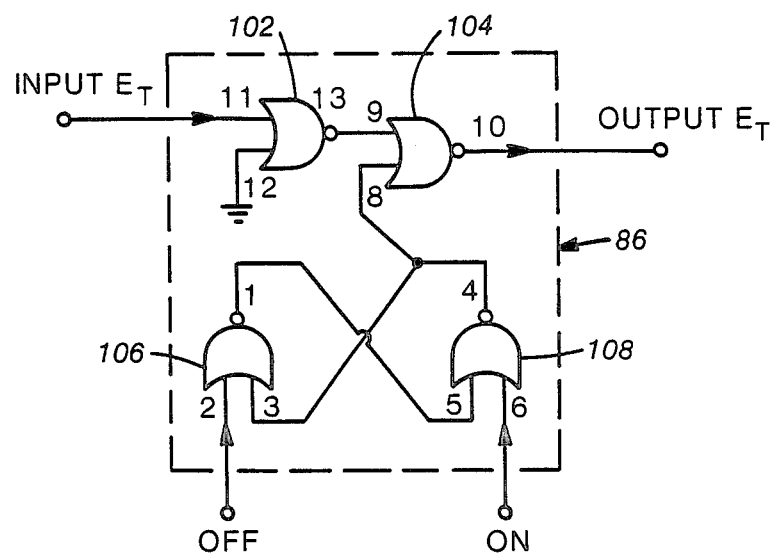
FIG. 5 is a schematic circuit diagram of the latching gate 86 of FIG. 4.

Referring first to FIG. 4, the phase update circuit 60a receives as inputs the delayed power line signal $E_L$ and the rotor feedback signal $E_R$, and produces as output the 8-bit phase update byte $E_P$ and the respective phase update byte load signal $L_P$. The input signal $E_L$ is applied to a 0.5 microsecond monostable multivibrator 82, which in the illustrated embodiment may be based on a Texas Instruments SN74123 integrated circuit. The multivibrator 82 functions to sharpen the pulses of the input signal $E_L$ so that they have a 0.5 microsecond pulse width. The output of the multivibrator 82 is used both as the input to a 0.5 microsecond delay unit 84 (which may be constructed from a Texas Instruments SN74123 integrated circuit chip) and also as the turn-off command to a latching gate 86. The latching gate 86 is described further below with reference to FIG. 5.

The latching gate 86 receives as its input signal a timing signal $E_T$ which is produced by a 4.9152 MHz clock 88 (which may be a Motorola K1091A) and a counter divider 90 (which may be based on a series combination of National Semiconductor SN74LS192 and SN74LS193 integrated circuit chips). The divider 90 operates to divide the frequency of the clock output signal by 160 and a the resulting signal $E_T$, having a frequency of 0.03072 MHz, as the signal input to the latching gate 86. The timing signal $E_T$ passes through the latching gate 86, when the gate 86 is on, to an 8-bit down counter 92. It will be recognized that the 8-bit counter, having a maximum decimal value of 255, will overflow after a counting period of 8.301 milliseconds, given the timing signal frequency of 0.03072 MHz. This period is slightly less than the nominal intervals of 8.333 milliseconds between the arrivals of successive (120 Hz) $E_L$ and $E_R$ signals.

The rotor feedback signal $E_R$ is applied to a 0.5 microsecond monostable multivibrator 94, which may be identical to the multivibrator 82. The sharpened, 0.5 microsecond pulse from the multivibrator 94 is applied to a 0.5 microsecond delay unit 96 (which may be the same as the delay unit 84) and is also applied as a load command signal to the 8-bit down counter 92 (which may be a National semiconductor 74LS 193 integrated circuit). The delayed output pulse from the delay unit 96 is applied as the turn-on command to the latching gate 86.

The down counter 92 decrements by one in response to each timing pulse from the latching gate 86, and its 8 parallel outputs are made available as standby inputs to an 8-bit data latch 98. The high value of the counter 92 is 255, to which the counter 92 is reset each time a load signal pulse is received from the multivibrator 94. The output of the data latch 98 is the same 8-bit byte as that received from the counter 92, and is the phase error byte $E_P$ produced by the computing unit 60.

The data latch 98 receives and loads the 8-bit byte from the down counter 92 upon receipt of a load command LD from the delay unit 84. The output of the delay unit 84 is also applied to another 0.5 microsecond delay unit 100, the output of which is the phase load signal $L_P$ transmitted from the computing unit 60 to the latch 64 of FIG. 3.

The operation of the phase update circuit may be described as follows. A rotor feedback pulse $E_R$ is sharpened by the multivibrator 94 and is applied to the down counter 92 to cause the down counter to reset to its high value of 255. A half microsecond later the delayed $E_R$ pulse from the delay unit 96 turns the latching gate 86 on, which then begins transmitting the timing pulses $E_T$ to the down counter 92. This results in the down counter 92 decrementing its count value upon the receipt of each timing pulse, i.e., at a rate of 30,720 kHz.

The power line signal $E_L$ may be considered as lagging behind the rotor signal $E_R$. At some time after the arrival of the $E_R$ pulse and the starting of the down counter 92 as described above, a delayed power line pulse $E_L$ arrives. This pulse is sharpened by the multivibrator 82 and is applied to the latching gate 86, turning it off. This stops transmission of timing pulses to the down counter 92 and thus freezes its count value at the then-occurring value. A half microsecond later the delayed power line pulse $E_L$, further delayed by the delay unit 84, is applied to the data latch 98 to cause it to load the count value present on the 8-bit bus from the down counter 92. After another half microsecond delay, the power line signal pulse $E_L$ is transmitted as the loading pulse $L_P$ from the delay unit 100 to cause the latch 64 (FIG. 3) to load the current value of the phase error byte $E_P$.

In the case of both the power line signal $E_L$ and the rotor signal $E_R$, the delay units 84 and 96 are employed for the purpose of ensuring that loading of either the down counter 92 or the data latch 98 is not attempted while timing signals from the latching gate 86 are being transmitted. As noted above, a half microsecond after the data latch 98 is loaded, the 8-bit phase error byte $E_P$ is transmitted from the computing unit 60 to the data latch 64. It will be recognized that the smaller the count value is (which is transmitted as the phase error byte $E_P$) the larger is the lag of $E_L$ behind $E_R$. Alternatively, it may be said that the larger the value of the phase error byte $E_P$ is, the larger is the lag of $E_R$ behind $E_L$. Thus the value of the phase error byte $E_P$ is a linear measure of the phase lag of $E_R$ behind $E_L$, up to a maximum of 255/0.0307, MHz=8,301 microseconds. Consequently, with nominal intervals of 8,333 microseconds for each of the $E_R$ and $E_L$ pulse periods, the down counter 92 will overflow (and give an erroneous reading) if a phase lag measurement of more than 8,301 microseconds is attempted. This could be easily avoided by using a slower clock. However, since the circuit is used in a system requiring both advances and retardations in phase, the best operating condition is a half-full data latch (i.e., an average phase error byte value $E_P$ of 128), which is equivalent to a 4,167 microsecond average phase lag of $E_R$ behind $E_L$. In practice the apparent phase lag is set to fall in this range by adjustment of the delay unit 20 of FIG. 1.

The circuit could easily be modified to obtain higher resolution over narrower ranges of phase lag. For example, by changing the quotient of the dividing counter 90 from 160 to 16, a ten-fold increase in resolution could be obtained over a phase lag range of zero to 830 microseconds.

The circuitry of the latching gate 86 is essentially that of a dual-NOR AND gate controlled by a dual-NOR flip-flop. Details of the circuitry are set forth in FIG. 5, with the pin numbers shown therein corresponding to those of a Texas Instruments SN7402 quad NOR gate integrated circuit. More specifically, the timing signal $E_T$ is transmitted through a pair of NOR gates 102 and 104 which are connected in series. A second pair of NOR gates 106 and 108 are connected so as to function as a flip-flop. A pulse received at the input to the NOR gate 102 from the multivibrator 82 causes the NOR gate 104 to turn off, and a pulse received at the input to NOR gate 108 from the delay unit 96 causes the NOR gate 104 to turn on.

The speed update circuit 60b is illustrated in FIG. 6. The essential elements of the circuit 60b, with exemplary commercially available components identified in parenthesis, include a 4.9152, MHz clock 120 (K1091A), a presettable 8-bit counter 122 (74193), an 8-bit up-/down counter 124 (74193), a divide-by-160 counter 126 (74192,3), an OR gate 128 (7432), a 0.5 microsecond delay unit 130 (74123), a 7 microsecond delay unit 132 (74123), a pair of 0.5 microsecond monostable multivibrators 134 and 136 (74123), and four latching gates 138, 140, 142 and 144. The circuit 60b further includes a pulse train generator, further described below, which produces a train of 8 signal pulses P1 through P8 that are utilized in the manner described below.

The 4.9152 MHz lock 120 has a frequency equal to $10 \times 2^{12} \times 120$ Hz, which is convenient for timing of pulse trains having frequencies of approximately 120 Hz.

The delay unit 130 converts the leading edge of any input pulse into a 0.5 microsecond output pulse with a delay of 0.5 microsecond. Details of the circuitry of the delay unit 130 are set forth in FIG. 10. The delay unit 132, which may comprise a SN74123 integrated circuit, converts the downstroke of a pulse of any length into a 0.5 microsecond output pulse after a delay of 7 microseconds.

Figure 8:
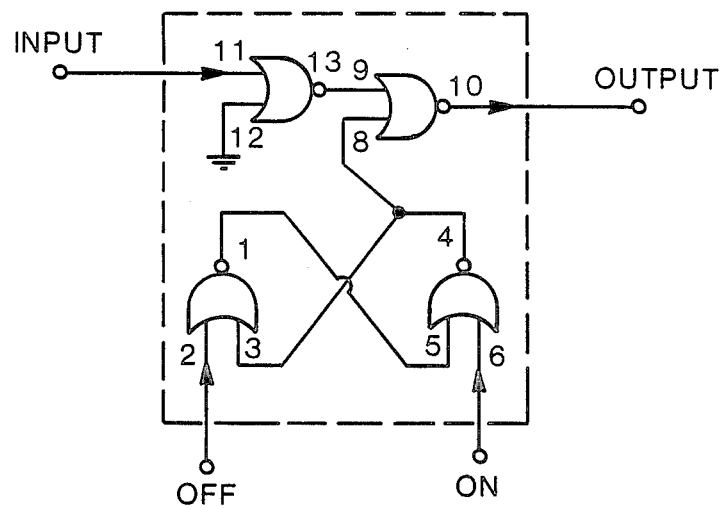
FIG. 8 is a schematic electrical diagram of the circuitry of each of the four latching gates 138 through 144 of FIG. 6

Each of the latching gates 138 through 144 has the circuitry shown in FIG. 8, which consists essentially of a dual-NOR AND-gate controlled by a dual-NOR flip-flop. A single pulse applied to the ON (or OFF) terminal of the latching gate will enable (or block) the transmission of pulses from the input to the output of the gate. In practice, each of the latching gates 138 through 144 may be formed from a single SN7402 quad NOR gate integrated circuit, using the pin connections indicated by the pin numerals in FIG. 8.

Figure 7:
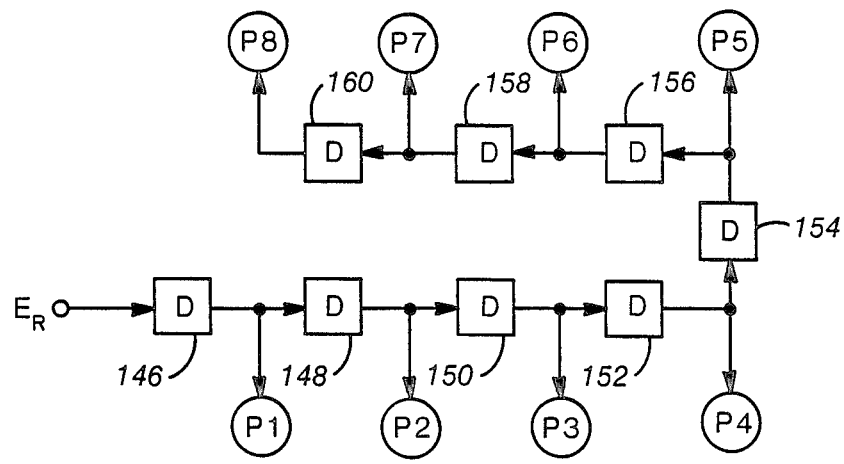
FIG. 7 a schematic diagram of the octo-pulse-train generator circuit 145 which produces the logic control si pulses P1 through P8 indicated in FIG. 6.

The speed update circuit 60b receives as input only the rotor feedback signal pulses $E_R$, which ordinarily arrive at intervals of approximately 8333 microseconds. Each rotor feedback pulse $E_R$ is converted to a train of 8 signal pulses P1 through P8 by an octo-pulse-train generator circuit 145, which is illustrated in FIG. 7. The octo-pulse-train generator circuit 145 consists of a chain of eight 1 microsecond delay units 146 through 160 which are connected in series, with taps connected to the outputs of the respective delay units providing the pulses P1 through P8. Thus, the pulses P1 through P8 consist of pulses which are 1.0 microsecond apart and which are each 1.0 microsecond in duration. Each of the delay units may consist of a SN74123 dual monostable multivibrator wired to generate the 1.0 microsecond pulses.

Figure 9:
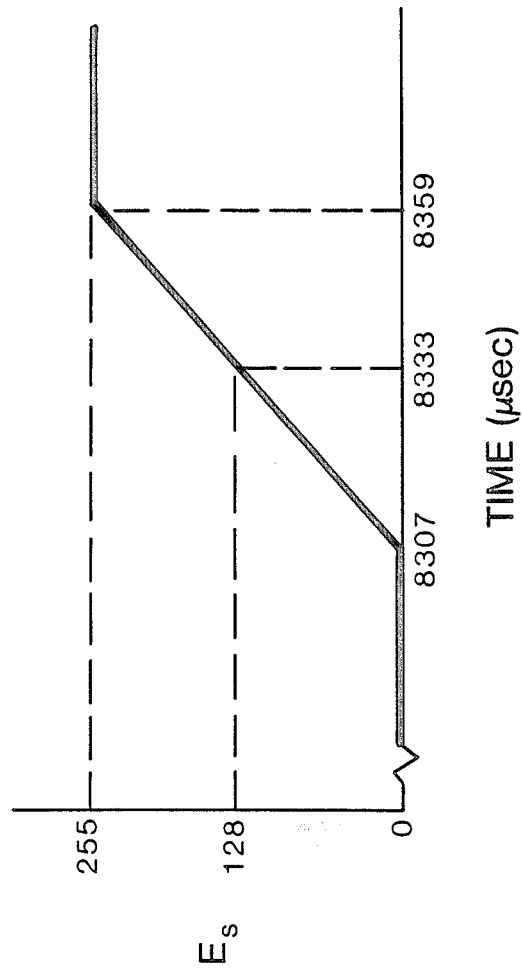
FIG. 9 is a graph of the transfer function of the speed update circuit 60b of FIG. 6.

The transfer function of the speed update circuit 60b is illustrated in FIG. 9, which shows the end-of-period decimal value of the speed error byte $E_S$ as function of the interval between successive rotor feedback pulses $E_R$. As indicated, the circuit has a linear response over a range of intervals which is centered on the interval value of $T=1/120=8333$ microseconds, which is ideal interval value for the situation where the rotor is turning at a speed corresponding to power line frequency of exactly 60 Hz. The range of intervals over which the response of the circuit is linear is 52 microseconds, and extends from 8307 to 8359 microseconds. It will be recognized that intervals greater than 8333 microseconds represent rotor speeds which are too slow, and intervals less than 8333 microseconds represent rotor speeds which are too fast.

As discussed below, the speed update circuit 60b includes automatic means to ensure that any rotor signal interval greater than 8359 microseconds will result in a speed error byte of 255, and that any interval less than 8307 microseconds will result in a speed error byte of zero. It will be further recognized that the linear range of interval values measured by the circuit is in correspondence with an almost linear range of $E_R$ pulse rates extending from a frequency f1 of $1/(0.008359)=119.63$ Hz to a frequency f2 of $1/(0.008307)=120.38$ Hz. Thus, in the illustrated embodiment, the circuit measures $E_R$ pulse rates almost linearly over a range of 0.75 Hz centered on 120 Hz, with a resolution of 0.003 Hz per counter step. This results in a transfer function which is very sensitive to speed deviations from the optimum corresponding to 120 Hz, and which provides a constant maximum corrective signal in the event of deviations outside a narrow range of speeds.

Figure 10:
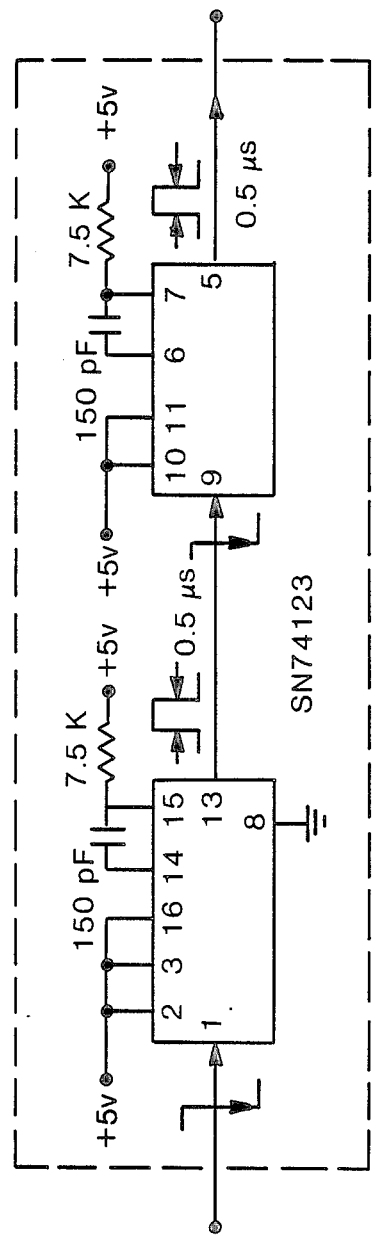
FIG. 10 is a schematic electrical diagram of the pulse delay unit 130 of the speed update circuit 60b of FIG. 6.

Referring to FIG. 10, the 0.5 microsecond delay unit 130 includes a SN74123 dual channel monostable multivibrator which is connected as shown (and which is illustrated schematically as consisting of two multivibrators) so as to produce a 0.5 microsecond output pulse after a delay of 0.5 microsecond from the receipt of an input signal. This is accomplished by applying the output pulse from one channel on pin 13 to the second input at pin 9, so as to produce the delayed output pulse pin 5.

The operation of the speed update circuit 60b is as follows. Upon receipt of an $E_R$ pulse at the pulse-train generator circuit 145, a sequence of 8 pulses is generated after an initial delay of one microsecond. The first pulse P1 is applied to the OFF terminal of the latching gate 138, thereby turning it off and stopping transmission of the timing pulses from the clock 120 to the 8-bit counter 122. The value in the counter 122 is thus frozen at an accumulated value which represents, with due allowance for the P1–P8 time lapse, the time interval since the receipt of the previous $E_R$ pulse. This value is represented by an 8-bit byte which is applied to an 8-bit parallel data bus connected to data input terminals of the up/down counter 124.

One microsecond later the second pulse P2 is applied to the load signal input terminal of the up/down counter 124, causing the counter 124 to load the value of the 8-bit byte representing the current value in the stopped counter 122. This v is then available on the output bus of the speed update circuit 60b as the 8-bit speed error byte $E_S$, discussed above with reference to FIG. 3.

In the event the interval between $E_R$ pulses is within the range of 8307 to 8359 microseconds, which is the linear range of the transfer function of FIG. 9, the third and fourth pulses P3 and P4 have no effect, and the fifth pulse P5 is applied as the load command signal $L_S$ which is applied to the speed error signal latch 62 of FIG. 3.

The sixth pulse P6 is applied to a programmable reset terminal of the 8-bit counter 122, causing it to reset to a predetermined initial value I. This initial value I is selected so as to be equal to one-half the maximum value of the counter 122, plus the number of clock pulses which span the duration of the 8 pulses P1 through P8. In the illustrated embodiment, therefore, $I=128+(16)(4.9152)=207$. The function of this operation is to reset the counter 122 and also correct it for the time lost during the generation of pulses P1–P8. In this regard, the 8-bit counter 122 counts to its maximum value of 255 each 52 microseconds, so that it overflows 160 times in the course of 8333 microseconds, the average and ideal interval on which the linear response range of the circuit 60b is centered. Thus, the last, or 160th, counting cycle of the 8-bit counter 122 is the cycle in which the counter is ordinarily stopped by receipt of the first pulse P1.

The seventh pulse P7 is applied to the OFF terminals of each of the latching gates 140 and 144, turning them off, and is also applied to the ON terminal of the latching gate 142 to turn it on.

The eighth pulse P8 is applied to the ON terminal of the latching gate 138, turning it on and thereby resuming once again the transmission of the timing pulses from the clock 120 to the preset 8-bit counter 122, which continue until the receipt of another $E_R$ pulse, at which time the process just described is begun again.

In the event the time interval since the receipt of the previous $E_R$ pulse is outside the range 8307–8359 microseconds, which is the linear response range of the circuit, a sequence of operations somewhat different from that just described occurs.

The 8-bit counter 122 overflows approximately 160 times in the course of each counting cycle. More specifically, the initial value of the counter 122 is set at the beginning of each cycle such that the counter overflows exactly 160 times and then attains a value equal to one-half its maximum value, or 128, in the event of a signal interval of 8333 microseconds. So long as the circuit 60b is measuring a time interval within the linear range shown in FIG. 9, the 8-bit counter 122 overflows 160 times and then attains some intermediate value between 0 and 255.

Each overflow of the 8-bit counter 122 is registered by a downstroke of the most significant bit, bit 8. This downstroke is applied to both the 0.5 microsecond monostable multivibrator 134 and the toggling input of the divide-by-160 counter 126.

The downstroke of the most significant bit of the divide-by-160 counter 126, which is generated after exactly 160 overflows of the 8-bit counter 122, is applied to the 0.5 microsecond multivibrator 136. The output of the multivibrator 136 is applied to both the OFF terminal of the latching gate 142 and the input of the 7 microsecond delay unit 132. At the beginning of the counting cycle, the latching gate 140 is turned off and the latching gate 142 is turned on, these gates having been set to such states by the pulse P7 of the previous cycle. Thus, until the divide-by-160 counter 126 has overflowed by receipt of 160 pulses from the overflow output of the counter 122, the latching gate 140 remains turned off and the latching gate 142 remains on.

In the event the 8-bit counter 122 is stopped (by pulse P1) before it has overflowed 160 times, which represents the situation where the interval between $E_R$ signals is less than 8307 microseconds (i.e., the rotor is going too fast), the divide-by-160 counter does not overflow and consequently does not produce an output signal. Consequently, the latching gate 142 remains open, and the pulse P3 passes through the gate 142 to the OR-gate 128. The OR-gate 128 then applies a signal to the clear terminal of the up/down counter 124, thereby clearing the value in the up/down counter 124 to zero. Upon the later receipt of pulse P5, this zero value is loaded as the speed error byte $E_S$ into the latch 62 (FIG. 3). It will also be noted that, in this situation, the latching gate 144 remains off during the counting cycle, having been turned off during the previous cycle and not turned on in the present cycle, and thus the pulse P4, which is applied to the input of the gate 144, is not transmitted to the up/down counter 124 and has no effect.

If the time interval since receipt of the previous $E_R$ pulse is within the range of 8307–8359 microseconds, the linear portion of the curve shown in FIG. 9, the 8-bit counter will overflow exactly 160 times and then be stopped at some intermediate value, thus causing the divide-by-160 counter 126 to overflow. This results in the latching gate 142 being turned off, thus inactivating the subsequent pulse P3. Also, the latching gate 144 remains off because there is not a subsequent, or 161st, pulse from the 8-bit counter 122 to pass through the multivibrator 134 and the now-enabled latching gate 140 and turn the gate 144 on. Thus, this is the situation already described above, wherein the pulses P3 and P4 have no effect on the value of the up/down counter 124 or the speed error byte $E_S$ resulting therefrom.

In the event the interval since the receipt of the previous $E_R$ pulse is greater than 8359 microseconds, i.e. the cycle period is too long and the rotor is turning too slowly, the 8-bit counter 122 overflows at least once more beyond the 160 times necessary to cause the divide-by-160 counter 126 to produce an output signal. The output signal from the divide-by-160 counter 126 is applied through the multivibrator 136 and the delay unit 132 to turn the latching gate 140 on after a delay of 7 microseconds. Thus, the next overflow pulse from the 8-bit counter, the 161st pulse, passes through the gate 140 and turns on the latching gate 144. As a result, the subsequent pulse P4 is transmitted through the latching gate 144 and is applied to both the OR-gate 128 and the 0.5 microsecond delay unit 130. The output of the OR-gate 128 clears the value of the up/down counter 124 to zero, and a half-microsecond later the delayed P4 pulse from the delay unit 130 applies a signal to the down-count terminal of the up/down counter 124, which causes it to decrement by one, from zero to its maximum value of 255 decimal. Thus, the value of the speed error byte transmitted on receipt of the fifth pulse P5 is 255, which represents the maximum speed error signal. It will be noted that in this situation, wherein the cycle period is too long, the pulse P3 has no effect and it is the pulse P4 which operates to set the speed error byte $E_S$ to its maximum value.

Upon completion of the process just described, the subsequent pulses P6, P7 and P8 operate as described above to reset the various latches to their starting states.

It will be recognized that the circuit 60b is protected against overflow of the up/down counter 124 by the use of the pulses P3 and P4 to set the up/down counter 124 to 0 or 255, respectively, depending on whether the cycle time is too short or too long. It will also be noted that the circuit just described obtains a very precise measurement of rotor speed over a small range of speeds. This is accomplished by using a fast counter which registers a large number of counts over the full cycle period, and which also utilizes the full scale of the counter within a narrow range of rotor speeds so as to obtain a magnified, or vernier effect with the counter.

Various modifications and/or improvements to the speed update circuit 60b may be evident to persons of ordinary skill in the computer electronics art. For example, a P6-operated blanker can be inserted in the output of the multivibrator 136 if the particular divide-by-160 counter 126 emits a spurious pulse on being reset to zero. Other ranges of the $E_R$ input pulse rate are readily accommodated by appropriate changes in the clock frequency and the quotient selected for the divide-by counter 126. If the desired range in the $E_R$ pulse period to be measured is a substantial fraction of the average pulse interval, and if the circuit output is to be linear in pulse rate rather than pulse period, a microprocessor using $E_S$ as the data input could be used to improve the linearity (at the cost of only a small additional time lag). Referring now to FIG. 11, the drift update circuit 60c includes a 4.9152 MHz clock 170, and divide-by-10 counter 172, a-6-bit rate multiplier 174, a hex-switch rate selector 176, a NOR-gate 178, a 14-bit counter 180, an 8-bit up/down counter 182, a byte status sensor 184, an up/down controller 186, and a one-microsecond monostable multivibrator 188.

Figure 12:
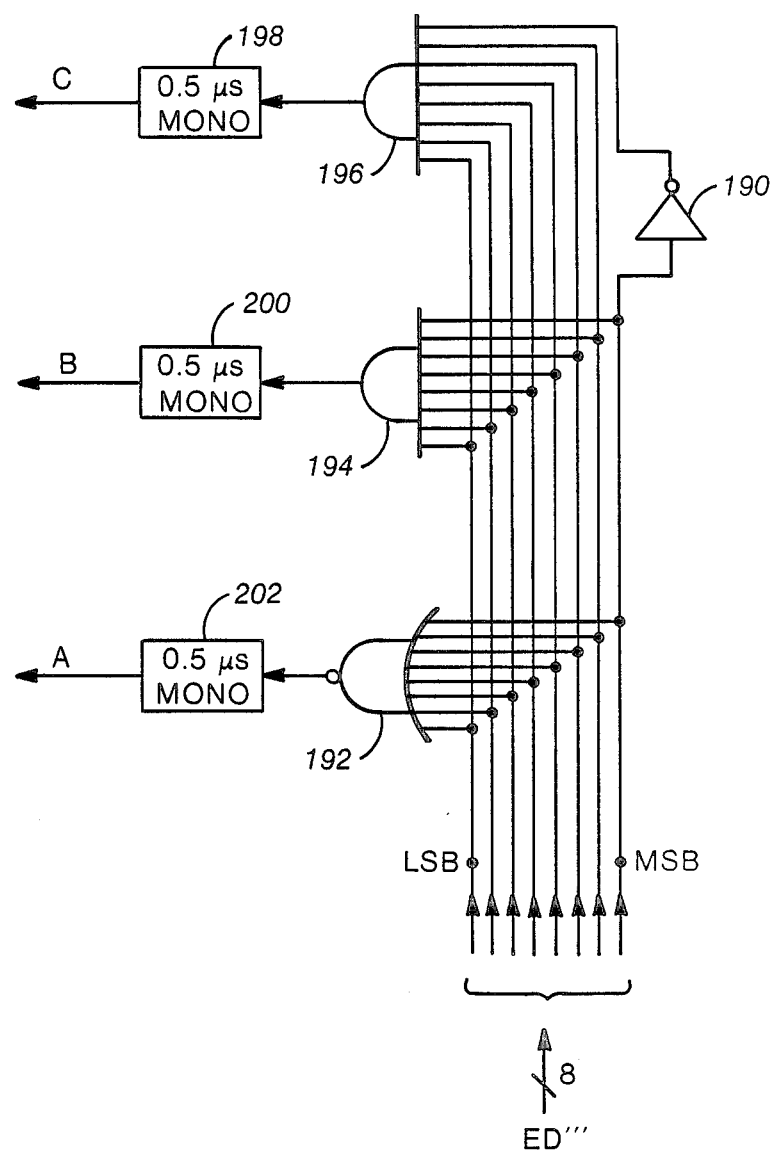
FIG. 12 is a schematic diagram of the byte status sensor 184 of the drift update circuit 60c of FIG. 11.

The byte status sensor 184 has the circuitry illustrated in FIG. 12. The sensor 184 receives as input the drift update byte $E_D$, received in the format of an 8-bit parallel-binary number $0<N<255$. Its functions are to emit a single 0.5 microsecond output pulse A if N=0, or to emit a single 0.5 microsecond output pulse B if N=255, or to emit a single 0.5 microsecond output pulse C if N=128. These functions are achieved in the manner shown by use of an inverter 190, an 8-input NOR-gate 192, a pair of 8-input AND gates 194 and 196, and three monostable multi-bit vibrators 198, 200 and 202. The most significant bit of the drift update byte $E_D$ is applied to the inverter 190 and then to the AND-gate 196, together with the other 7 bits, whereas all 8 bits of the $E_D$ byte are applied to the NOR-gate 192 and the AND-gate 194. The outputs of the NOR-gate 192 and AND-gates 194 and 196 are applied respectively to the multivibrators 202, 200 and 298, the outputs of which are the signals A, B and C, respectively.

Figure 13:
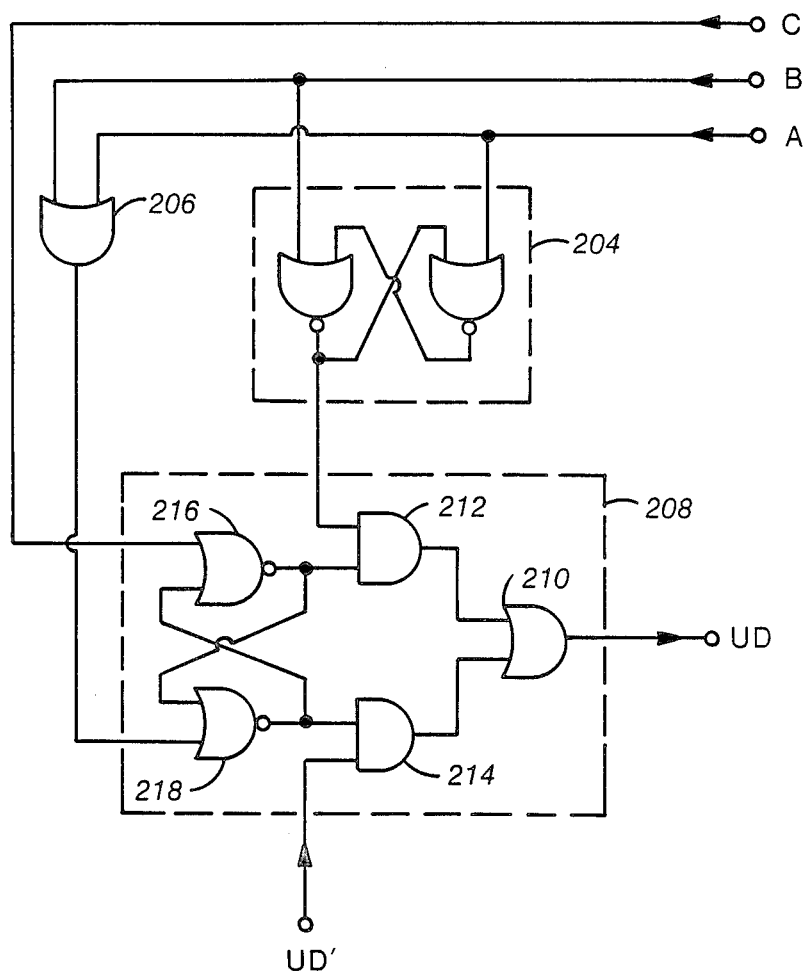
FIG. 13 is a schematic diagram of the up/down controller 186 of the drift update circuit 60c of FIG. 11.

The circuitry of the up/down controller 186 is illustrated in FIG. 13. It consists of a dual-NOR flip-flop 204, a simple OR-gate 206, and a specific purpose logic switch 208. The input signals to the controller circuit 186 are the three nonoverlapping pulses A, B and C, and a logic level signal UD'. The output of the up/down controller is a logic level signal UD. The switch 208 serves as a pulse-operated single-pole, double-throw switch, constructred as shown by use of an OR-gate 210, a pair of AND-gates 212 and 214, and a flip-flop consisting of two NOR-gates 216 and 218. The dual-NOR flip-flop 204 receives as inputs the signals A and B and provides an output signal to the AND-gate 212 of the switch 208. The signals A and B are also applied to the OR-gate 206, the output of which is applied to the NOR-gate 218 of the switch 208. The signal C is applied to the other NOR-gate 216 of the switch 208. With such a configuration, a C pulse causes the logic level input signal UD' to be transmitted as the logic level output signal UD, a condition that remains unchanged until and unless the OR-gate 206 produces an output signal in response to either, an A or a B pulse. Either an A or a B pulse causes the source of the logic level output signal UD to switch from the logic level signal UD' to the output of the flip-flop 204, where it remains until a subsequent C pulse arrives. The state of the flip-flop 204 depends on whether A or B arrived last. If the A pulse arrived last, the output of the flip-flop 204 will be held at a high logic level (e.g., 5 volts). If the B pulse arrived last, the output UD of the switch 208 will be held at a low logic level (eg. zero volts) until a C pulse arrives and equates UD to UD'.

Returning to FIG. 11, one of the two outputs of the drift update circuit 60c is the 8-bit parallel byte $E_D$, which is generated by the up/down counter 182. The value of the counter 182 can be initialized to a count value of N=128 by application of a reset/load pulse R. Further, the direction of counting of the counter is governed by the UD output signal of the up/down controller 186. The second output of the drift update circuit 60c is the load command signal $L_D$, which is produced by the multivibrator 188 in response to the input pulse $E_L$.

The up/down controller 186 receives the A, B and C input pulses from the respective A, B and C outputs of the byte status sensor 184, which is connected so that its input is the same as the output byte $E_D$ of the drift update circuit 60c. The UD' input to the up/down controller 186 is the input logic level of bit 7, i.e., bit 7 from the output of the phase update circuit 60a. If the phase lag is excessive, this bit is high.

The toggling input to the up/down counter 182 is the 0-to-30 Hz pulse train output of the 14-bit counter 180, which receives as its input the output of the NOR-gate 178. The inputs to the NOR-gate 178 are output signal $L_D$ from the multivibrator 188, and 0-to-491,520 Hz output of the pulse-rate multiplier 174. The pulse-rate multiplier 174 receives as input the output of the divide-by-10 counter 172, which in turn receives as input the output from the clock 170.

The output frequency of the rate multiplier 174 can be adjusted in 64 steps of 7680 Hz each, over the 0-to-491,520 Hz range, by means of a 6-bit word supplied by the hex-switch rate selector 176. For example, with the mid range setting of 32 (i.e., with only the most significant switch being active) in the rate selector, the rate multiplier 174 has an output frequency of 491,520/2=245,760 Hz, and the output frequency of the 14-bit counter 180 will be 15 Hz. At such a slow 15 Hz toggling rate, the 8-bit up/down counter 182 would require a time lapse of almost 8.5 seconds to progress from its manually preset count of N=128 to its next-to-overflow count of N=255, even if the bit 7 input remained high at all times.

In actual operation, the effect (through the $E_D'$ motor control loop) of N>128 is to bring about (within a time interval that is small compared with the 8.5 second midscale time constant) a reversal of the bit 7 input level to zero. This causes a slow decline in the value of $E_D$ toward a value of N<128, which brings about a return of bit 7 to its high level through the feedback action of the motor control loop. Under normal operating conditions, the number N in the up/down counter 182 does not deviate far from its mid-range value of N=128, so the up/down controller 186 receives no A or B pulses from byte status sensor 184.

However, if by chance the bit 7 input remains high (or low) for too long, for example due to an unexpected significant increase in motor bearing drag, the number N in the up/down counter will increase to its upper limit level of 255 (or decrease to its lower limit level of zero), thus triggering a B pulse (or an A pulse) from the byte status sensor 184. The resulting action of the up/down controller is to temporarily disconnect the bit 7 input and allow the slow toggling rate to return the number in the counter 182 to its mid-range value of N=128, after which the bit 7 input is reconnected. In this manner, an overflow or underflow of the up/down counter (and the accompanying disruptive full-scale snap-action excursion of its N value) is avoided. An alarm bell triggered by the output of the OR-gate 206 could be used to signal the need for external retrim of the voltage-controlled oscillator 42 (FIG. 2) in the motor drive circuit, if desired.

From the foregoing description, it is seen that the drift update circuit 60c performs several functions in addition to that of maintaining a running time integral of abnormal phase lag. It provides an adjustable time constant, an automatic pause of the final up/down counter while emitting the output load command $L_D$, and an external reset of the output byte $E_D$ to its mid-range value. It also includes provisions for avoiding overflow or underflow of the final counter, as well as provisions for automatic and gentle return to center, thus preventing spurious and disruptive jumps in the value of the output byte $E_D$.

Referring again to FIG. 3, in starting up the system, only the speed error signal $E_S'''$ is desirable and necessary, in which case the gains of the attenuators 76 and 78 are automatically held at zero by means of an electronic switch (not shown), which is actuated only when the value of $E_S'''$ is large. Once the motor is brought up to full operational speed by the speed error signal $E_S'''$, the phase error signal $E_P$ automatically adjusts the angle of the chopper to its predetermined phase-locked position. As noted above, the drift error signal $E_D'''$ serves only to compensate for any gradual changes in the parasitic component of the motor load (windage and bearing drag), and has little effect over time spans of less than a minute. Hence, the gain of the drift signal attenuator 78 may be manually held at zero while making the initial (one-time) adjustments of the $E_S'''$ and $E_P'''$ attenuators for optimum performance of the chopper at operational speed. It is noted that an excessive gain in the speed error attenuator 74 will result in rapid librations in the shaft angle, due to neglected second-order time lags. Excessive gain in the phase error attenuator 76 produces overshoot in the tracking error. Optimum performance is obtained when the speed error attenuator 74 is set for maximum libration-free gain and the phase error attenuator is set for critical damping.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A controller for controlling the speed of a multiphase induction motor so as to maintain the motor in phase with an alternating-current power supply signal that is subject to meandering in frequency about a nominal line frequency, said motor including a plurality of power amplifiers having outputs which drive the respective stator windings of the motor, comprising:

shaft revolution sensor means operable to provide a feedback pulse train siganl having a frequency representative of the speed of said motor;

phase error signal generator means for generating a phase error signal representative of the phase difference between said alternating-current power supply signal and said feedback pulse train signal;

speed error signal generator means for generating a speed error signal that is representative of the difference between the speed of said motor and a predetermined desired speed, said predetermined desired speed being a speed at which said motor is in phase with said power supply signal at said nominal line frequency, said speed error signal generator means including a digital clock which produces a timing signal pulse train having a predetermined substantially constant frequency which is substantially higher than the frequency of said feedback pulse train signal, first digital counter means connected to receive said timing signal pulse train and said feedback pulse train signal, said first digital counter means operating to count pulses of said timing signal pulse train during intervals between receipt of successive pulses of said feedback pulse train signal, and means for converting the digital count value of said first digital counter means after each counting interval to said speed error signal;

drift error signal generator means for generating a drift error signal representative of the integral of said phase error signal over time;

a summing amplifier for combining said speed, phase and drift error signals to produce a single motor control signal, means for selectively weighting the relative contributions of said signals to produce said motor control signal such that said speed error signal effectively stabilizes the operation of said phase error signal to maintain the motor in phase with said alternating-current power supply signal, a voltage controlled oscillator connected to receive said motor control signal and produce a variable frequency control signal, a plurality of programmable read-only memories connected respectively with said power amplifiers and said stator windings of said motor, said memories containing sequentially addressable digitized representations of trigonometric functions which bear the appropriate phase relationships of the respective stator windings of the motor, and digital-to-analog converter means connected respectively with said programmable read-only memories for converting the contents of said memories to analog signals suitable for controlling the outputs of the respective power amplifiers, whereby said variable frequency control signal sequentially advances the addresses of said programmamble read-only memories at a rate determined by the magnitude of said motor control signal, thereby maintaining said motor in phase with said alternating-current power supply signal.

2. The controller defined in claim 1 wherein said phase error signal generator means includes a second counter means connected to receive said feedback pulse train signal and said alternating-current power supply signal, said second counter means being actuated during the time interval between successive individual pulses of said feedback pulse train signal and said alternating-current power supply signal, the count value attained during each such counting interval representing the phase difference between said feedback and power supply signals, and wherein said count value of said counter means is applied after each counting interval to a phase error digital-to-analog converter to produce said phase error signal.

3. The controller defined in claim 1 wherein said drift error signal generator means includes means for gradually returning the drift error signal to a mid-range zero value after each transmission to said summing amplifier, so as to avoid disruptive jumps in the value of the drift error signal.

4. The controller defined in claim 1 further comprising means for preventing overflow or underflow of said first digital counter means at the end of each counting interval, whereby the count value of said first counter is held at the maximum or minimum count value of the counter in the event the speed of the motor is outside a predetermined narrow range of speeds centered on said predetermined desired speed, and whereby there is obtained a high-gain speed error signal to small deviations in motor speed from the desired speed.

* * * * *